US007011456B2

(12) United States Patent
Yang

(10) Patent No.: US 7,011,456 B2
(45) Date of Patent: Mar. 14, 2006

(54) CONNECTOR FOR AN OPTICAL TRANSMITTING AND RECEIVING DEVICE

(76) Inventor: Johnson Yang, No. 93, Ciaohe Rd., Jhonghe City, Taipei County (TW)

( * ) Notice: Subject to any disclaimer, the term of this patent is extended or adjusted under 35 U.S.C. 154(b) by 185 days.

(21) Appl. No.: 10/712,815

(22) Filed: Nov. 12, 2003

(65) Prior Publication Data
US 2005/0100291 A1 May 12, 2005

(51) Int. Cl.
G02B 6/36 (2006.01)
(52) U.S. Cl. .............................. 385/92; 385/53; 385/88
(58) Field of Classification Search ............. 385/88–94
See application file for complete search history.

(56) References Cited

U.S. PATENT DOCUMENTS 6,361,218 B1 * 3/2002 Matasek et al. .............. 385/60
6,739,765 B1 * 5/2004 Liu ............................. 385/92
2002/0191921 A1 * 12/2002 Satoh .......................... 385/92

* cited by examiner

Primary Examiner—Brian Healy
Assistant Examiner—Derek L. Dupuis
(74) Attorney, Agent, or Firm—Charles E. Baxley

(57) ABSTRACT

A connector for an optical transmitting and receiving device includes a housing, an assembly part, a cover and a spring. Between the cover and the assembly part is provided a positioning device for positioning the cover. The housing is reverse "U"-shaped so as to form an open mouth, and thus the cover can be easily fixed to the housing via the open mouth. On the internal surface of the housing is provided reducing holes, with this structure, the cover can be firmly positioned after being assembled in the housing.

9 Claims, 10 Drawing Sheets

CONNECTOR FOR AN OPTICAL TRANSMITTING AND RECEIVING DEVICE

BACKGROUND OF THE INVENTION

1. Field of the Invention

The present invention relates to a connector, and more particularly to a connector for an optical transmitting and receiving device.

2. Description of the Prior Art

Optical transmission usually uses an optical transmitting and receiving device (such as Laser Diode) to provide optical signals, the optical signals enter in an end of a fiber and will be transmitted out from another end, and then received by another optical transmitting and receiving device. Since the fiber and the optical transmitting and receiving device are independent from each other, they need to be connected by a coupling element.

The coupling element refers to a connector provided for insertion of optical transmitting and receiving device and fiber, which generally includes an assembly part mounted on a housing, and a cover flexibly assembled on the assembly part. With reference to FIGS. 9–10, each of which shows a conventional connector for an optical transmitting and receiving device. Referring first to FIG. 9, wherein a connector for an optical transmitting and receiving device generally includes a movable cover 11, an assembly part 10b and a housing 10a. The movable cover 11 can be assembled on the assembly part 10b, when both of which are assembled together on the housing 10a, and pushed by a spring 15, the movable cover 11 can be positioned. However, as can be seen in this figure that there is no any positioning device provided between the cover 11 and the assembly part, the movable cover 11 is susceptible to slippage when assembling the cover 11 to the assembly part 10b.

As shown in FIG. 10, which shows another conventional connector for an optical transmitting and receiving device, the assembly of this connector is inconvenient because the user has to carefully insert a shaft 31 of a cover 3 in a side of an assembly part 1 first and then the cover 3 can be fully assembled on the assembly part 1, furthermore, there is no any positioning device provided between the cover 3 and the assembly part 1, the cover 3 is susceptible to slippage during assembly.

The present invention has arisen to mitigate and/or obviate the afore-described disadvantages of the conventional connector for an optical transmitting and receiving device.

SUMMARY OF THE INVENTION

The primary object of the present invention is to provide a connector for an optical transmitting and receiving device, which includes a housing, an assembly part, a cover and a spring, wherein the cover can be easily assembled on the housing, furthermore, a positioning device is provided between the housing and the cover for positioning the cover.

In order to assemble the cover easily on the housing, the housing is reverse "U"-shaped so as to form an open mouth, and thus the cover can be easily fixed to the housing via the open mouth.

In order to firmly position the cover in the housing, on the internal surface of the housing is provided with reducing holes, with this structure, the cover can be firmly positioned after being assembled in the housing.

The present invention will become more obvious from the following description when taken in connection with the accompanying drawings, which shows, for purpose of illustrations only, the preferred embodiment in accordance with the present invention.

DETAILED DESCRIPTION OF THE PREFERRED EMBODIMENTS

Figure 1:
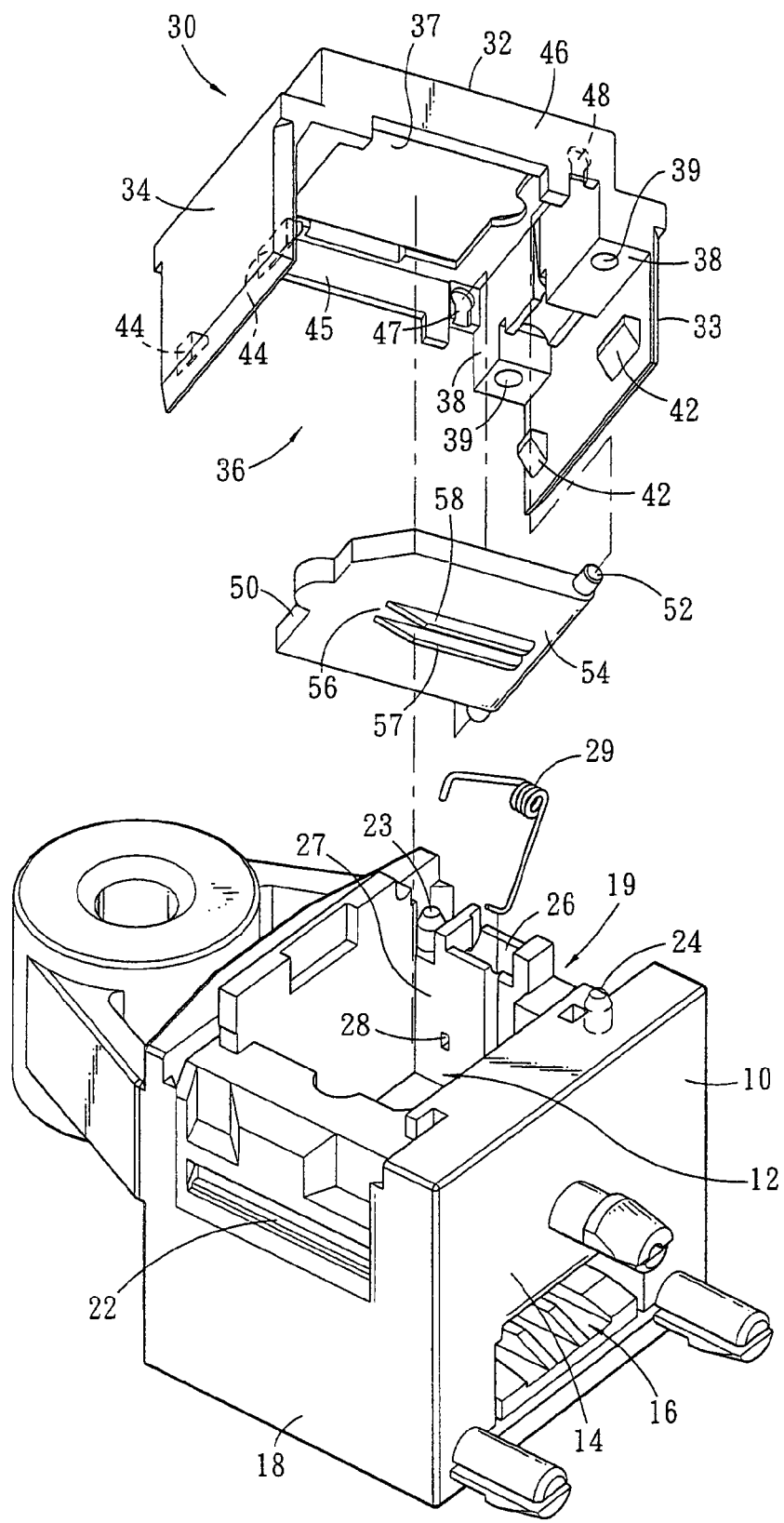
FIG. 1 is an exploded view of a connector for an optical transmitting and receiving device in accordance with the present invention.

Referring to FIG. 1, a connector for an optical transmitting and receiving device in accordance with the present invention generally comprises a housing 10, an assembly part 30, a spring 29 and a cover 50.

The housing 10 is shaped in the form of a square block, at the center of which is provided with a chamber 12, on a sidewall 14 of the housing 10 is formed a plug jack 16 that is in communication with the chamber 12.

Furthermore, on another sidewall 18 of the housing 10 is defined a groove 22, on an opposite sidewall 19 to the sidewall 18 is defined the same structure. Two lugs 23, 24 are defined between the sidewall 19 and the chamber 12, both of the lugs 23, 24 are parallel to each other. Between the sidewall 19 and the chamber 12 is further provided a recess 26, and a through hole 28 is formed on a wall 27 of the recess 26. By such arrangements, a spring 29 can be received in the recess 26 in a manner that an end of spring 29 protrudes out of the recess 26 and another end of the spring inserts through the hole 28, such that the spring 29 is firmly fixed.

The assembly part 30 is reverse "U"-shaped, which includes a top portion 32 and a pair of first opposite sidewalls 33, 34, and thus an open mouth 36 is formed opposite to the top portion 32.

At the top portion 32 is defined a window 37, between the internal surface of the first sidewall 33 and the top portion 32 is provided two shoulder portions 38, each shoulder portion 38 is defined with a cavity 39. Furthermore, on the internal surface of the first sidewall 33 is provided two protrusions 42, in like manner, on the internal surface of the sidewall 34 is provided two protrusions 44.

A pair of second opposite sidewalls 45, 46 stands perpendicular to the top portion 32, both of which are provided with holes 47, 48 on its internal surface respectively. The radius of the holes 47, 48 changes according to real needs, as shown in FIG. 1, wherein the holes 47, 48 are designed to have a big and a small ends.

The cover 50, at a side of which is provided a shaft 52, and at a bottom of the cover is defined a positioning notch 56 which can be formed between a pair of parallel opposite protruding plates 57, 58.

Figure 2:
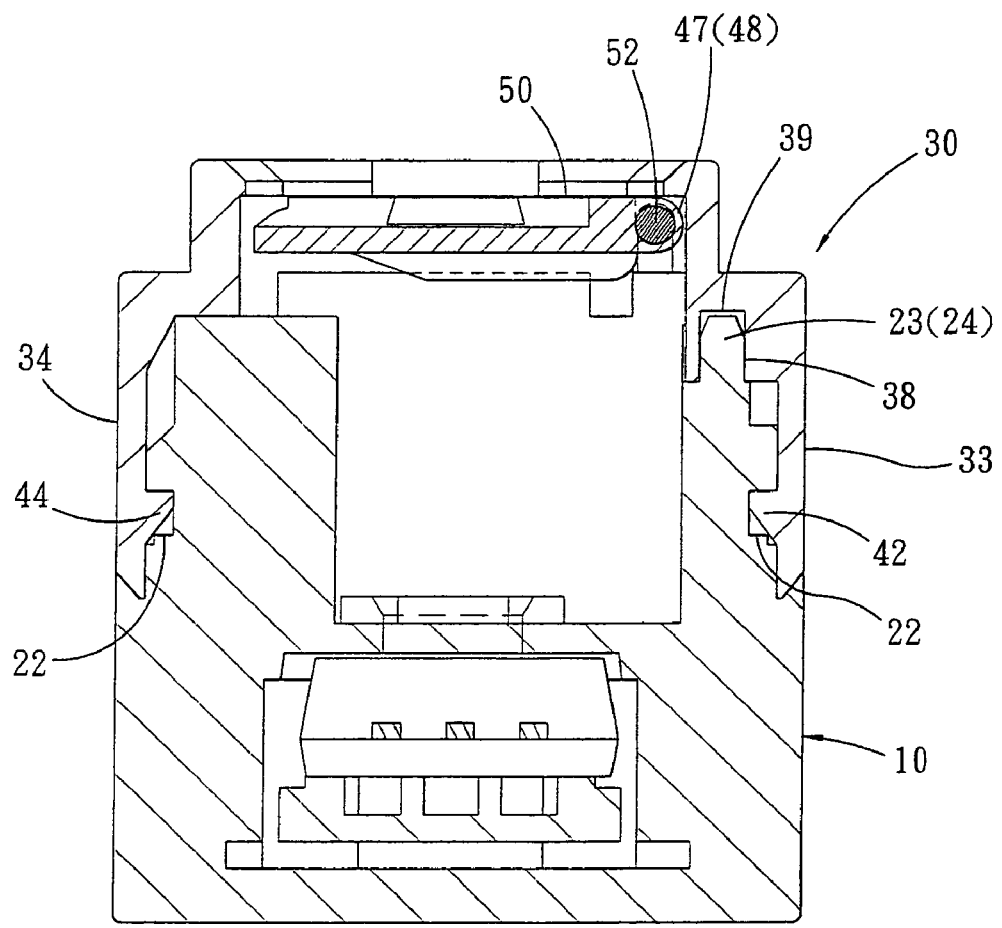
FIG. 2 is a cross sectional view of the connector for an optical transmitting and receiving device in accordance with the present invention.

Referring to FIGS. 1 and 2, wherein the cover 50 is inserted through the open mouth 36 and then assembled to the assembly part 30 in a manner that the shaft 52 engages both in the big ends of the holes 47, 48. Since the external diameter of the shaft 52 is close to the internal diameter of the holes 47, 48, the shaft 52 can be firmly positioned.

Referring further to FIG. 2, in which, the lugs 23, 24 of the housing 10 serve to engage in the cavities 39 on the shoulder portions 38 of the assembly part 30. The first paired opposite sidewalls 33, 34 of the assembly part 30 corresponds to the outer surface of the housing 10 so as to enable the protrusions 42, 44 to be engaged in the groove 22. In this way, the assembly part 30 is firmly fixed to the housing 10.

Figure 3:
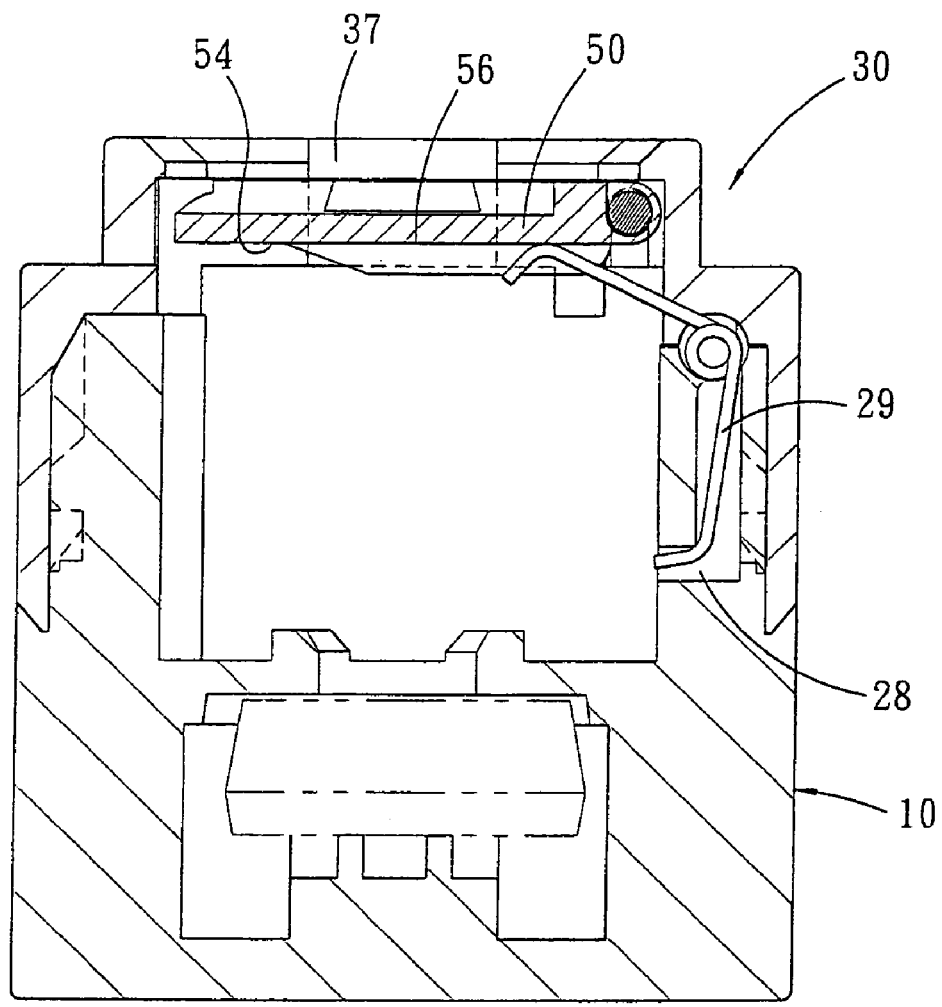
FIG. 3 is another cross sectional view of the connector for an optical transmitting and receiving device in accordance with the present invention.

Referring to FIG. 3 again, which shows that the spring 29 is disposed in the housing 10 in a manner that an end of which protrudes out of the housing 10, in this case, after the assembly part 30 is assembled to the housing 10, an end of the spring 29 is allowed to abut against the bottom 54 of the cover 50 especially engaging in the positioning notch 56. Therefore, the cover 50 is pushed by the spring 29 to seal the window 37 of the assembly part 30.

Figure 4:
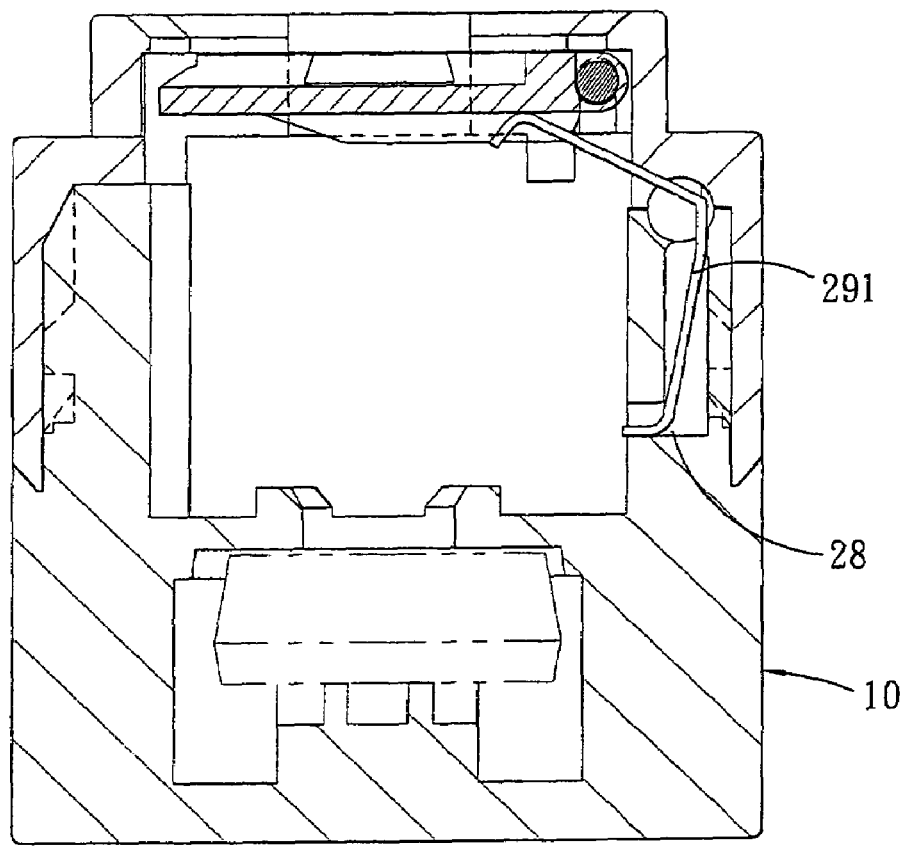
FIG. 4 is a cross sectional view of a connector for an optical transmitting and receiving device with an "U"-shaped spring in accordance with the present invention.

Referring to FIG. 4, a spring 291 disposed in the housing 10 can be in form of a "U"-shaped torsion spring.

It can be concluded from the above descriptions that since at a side of the assembly part 30 is defined an open mouth 36, the cover 50 can be easily assembled in the housing via the open mouth. Furthermore, the holes 47, 48 in the assembly part 30 are designed to have reduced diameters, with this structure, the cover 50 can be firmly positioned on the assembly part 30. Thereby, the assembly of the present invention is easy, and the cover 50 can be positioned firmly.

On the other hand, the assembly part 30 is provided with cavities 39 for engaging with the lugs 23 of the housing 10, which is further provided with protrusions 42, 44 respectively for engaging in the groove 22 of the housing 10. By such arrangements, the assembly part 30 can be firmly assembled to the housing 10.

Figure 5:
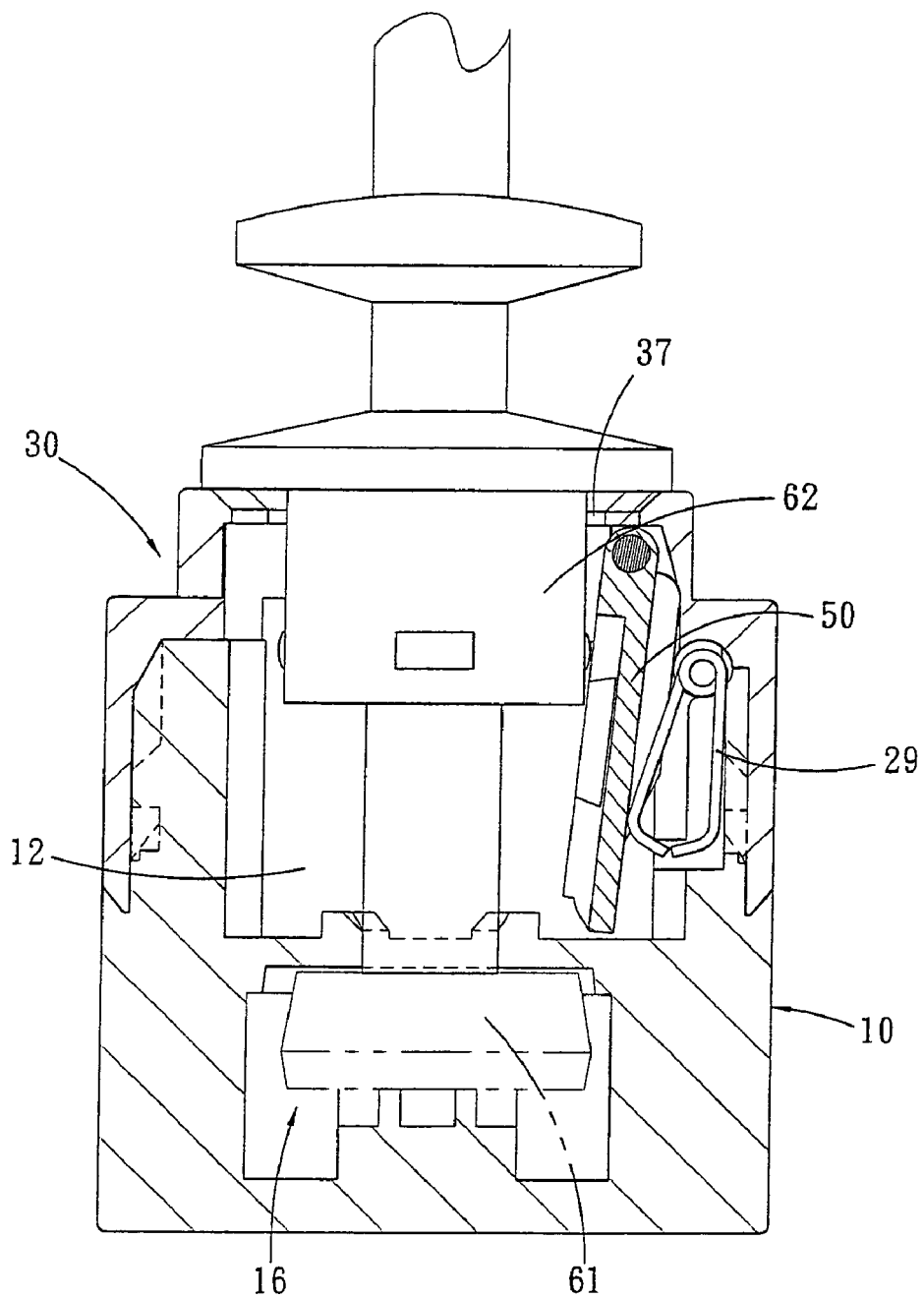
FIG. 5 is an illustrative view in accordance with the present invention of showing a cover of the connector is opened.

Referring to FIG. 5, an optical transmitting and receiving device 61 is inserted in the plug jack 16 of the housing 10, and corresponds to the chamber 12. A fiber 62 is inserted via the window 37 of the assembly part 30 into the recess 12 and an end of which corresponds to the optical transmitting and receiving device 61. At this moment, the cover 50 is pushed to press against the spring 29 and cause a deformation of the spring 29. When the user pulls out the fiber 62, under the influence of the spring 29, the cover 50 will return back to seal the window 37 again.

Figure 6:
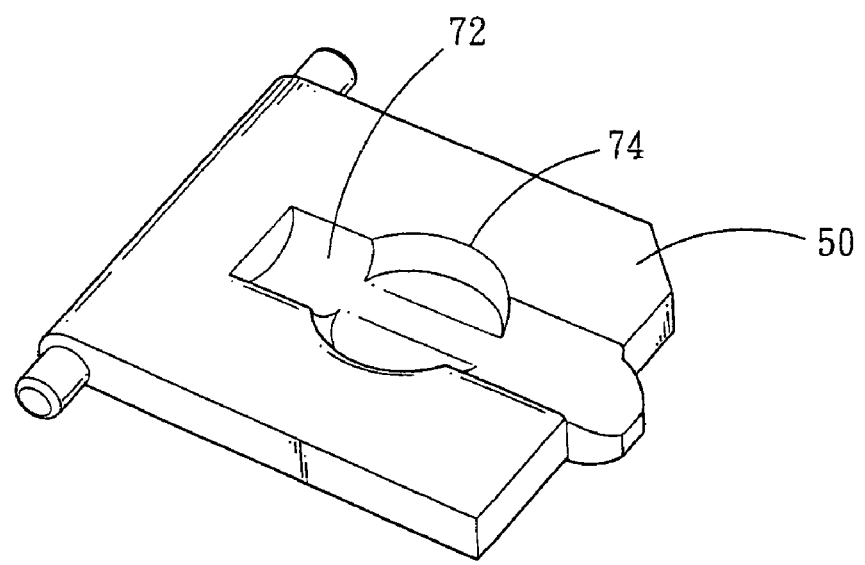
FIG. 6 is a perspective view of a cover of the connector for an optical transmitting and receiving device in accordance with the present invention.

Referring to FIG. 6, a groove 72 is formed on an upper surface of the cover 50, in which is further defined with a big-diameter cavity 74. When connecting the fiber (not shown), the user can initially insert an end of the fiber in the cavity 74, and then push against the cover 50, so as to move the fiber along the groove 72. By this way, the fiber can be inserted in the housing (not shown) quickly and easily. The conjunctions between the groove 72 and the cavity 74 can be smoothly formed for facilitating movement of the fiber.

Figure 7:
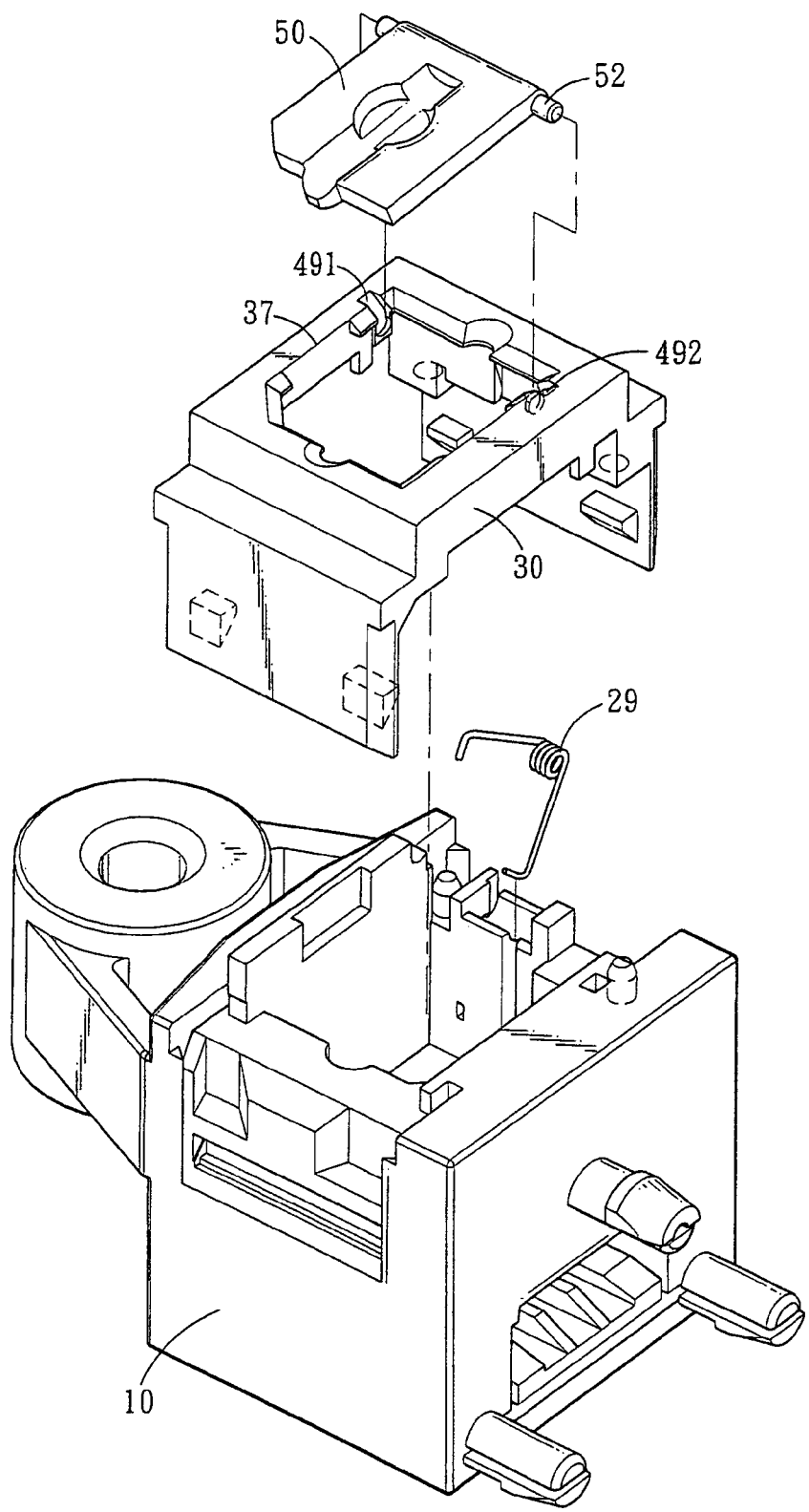
FIG. 7 is an exploded view of a connector for an optical transmitting and receiving device in accordance with a second embodiment of the present invention.
Figure 8:
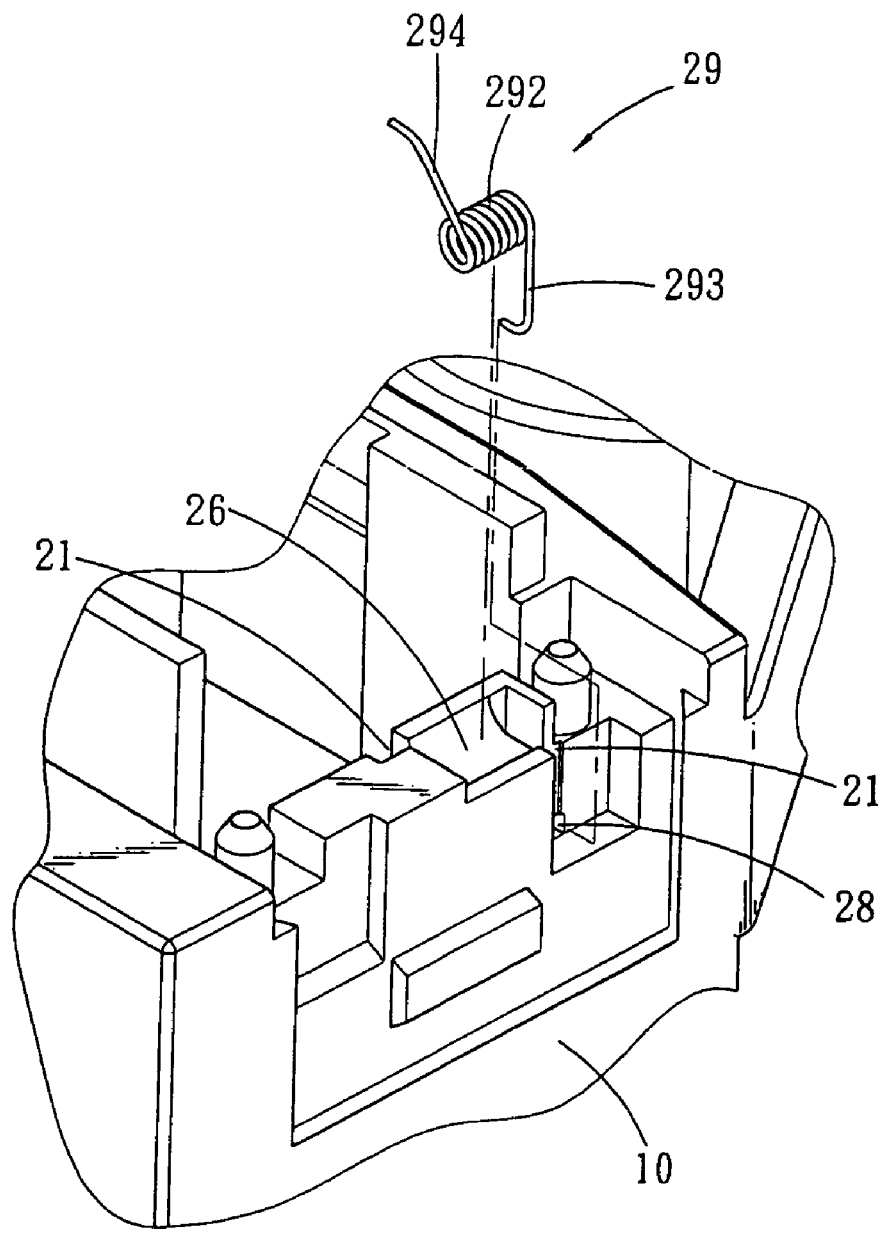
FIG. 8 is a partial perspective view of the connector for an optical transmitting and receiving device in accordance with a second embodiment of the present invention.
Figure 9:
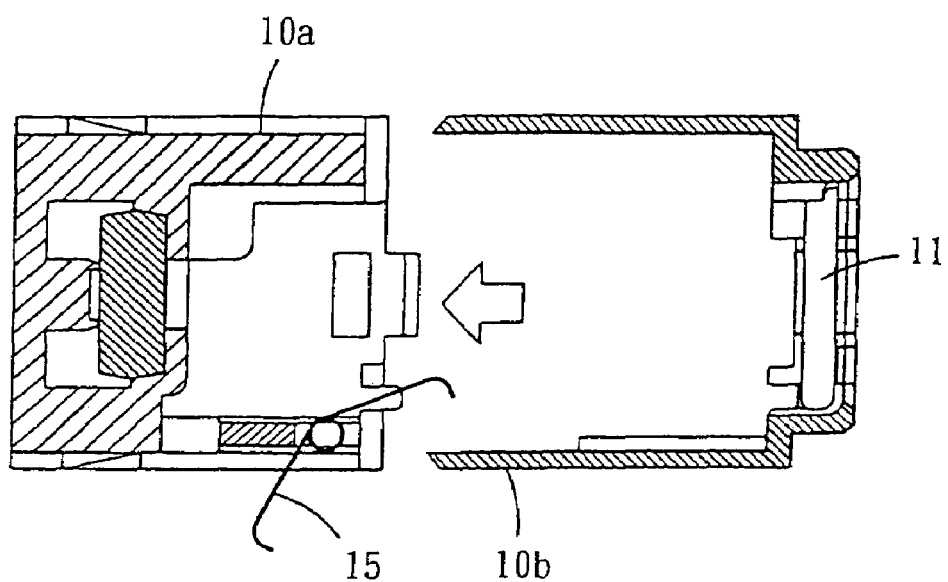
FIG. 9 is a cross sectional view of a conventional connector for an optical transmitting and receiving device.
Figure 10:
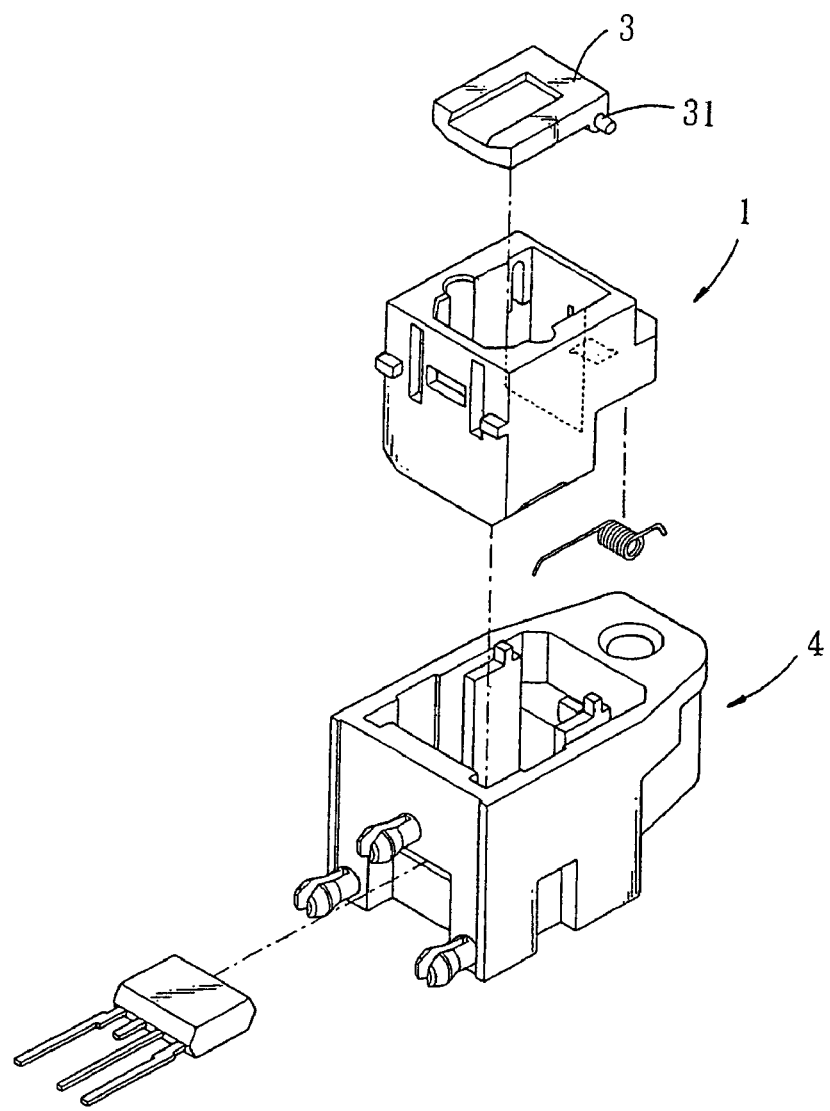
FIG. 10 is a cross sectional view of another conventional connector for an optical transmitting and receiving device.

Referring to FIG. 7, which shows a connector for an optical transmitting and receiving device in accordance with another embodiment of the present invention. On both opposite sidewalls of the assembly part 30 are provided holes 491, 492. Each of the holes 491, 492 has an end extending to a window 37, such that the holes 491, 492 open toward the window 37. In this way, the user can press the shaft 52 of the cover 50 downward to make it easily engage in the holes 491, 492. With reference to FIG. 8, a chute 21 is provided at both sides of the recess 26 of the housing 10 for fitting a first and a second ends 293, 294 of the spring 29 respectively. After the base body 292 of the spring 29 engaged in the recess 26, the first and the second ends 293, 294 will be exactly fitted in the chutes 21 in a manner that the first end 293 inserts in the through hole 28, such that the spring 29 is firmly fixed there in this way. The connector structure of the present invention not only facilitates the connection of the fiber but also the cover 50 and the spring 29 can be prevented from slipping out.

While we have shown and described various embodiments in accordance with the present invention, it should be clear to those skilled in the art that further embodiments may be made without departing from the scope of the present invention.

What is claimed is:

1. A connector for an optical transmitting and receiving device, comprising:

a housing provided with a chamber and a plug jack, on an outer surface of a pair of opposite sidewalls of the housing is respectively formed a groove, between one of the sidewalls and the chamber is thereof defined two lugs and a recess, and on the wall of the recess is provided a through hole;

a spring received in the recess in a manner that an end of the spring protrudes out of the housing and another end of the spring inserts through the through hole on the wall of the recess;

an assembly part including at least a top portion and a pair of first opposite sidewalls, a window formed at the top portion and an open mouth formed opposite to the top portion, on the internal surface of a pair of second opposite sidewalls perpendicular to the top portion is provided reducing holes, the paired first opposite sidewalls provided with protrusions, between at least one of the paired opposite first sidewalls and the top portion is provided cavities, and the assembly part is firmly fixed to the housing by the insertion of the lugs of the housing in the respective cavities in the assembly part; and a cover, provided at a side thereof with a shaft, serving to engage in a bigger-radius portion of the reducing holes of the assembly part, an end of the spring employed to push against the bottom of the cover.

2. The connector for an optical transmitting and receiving device as claimed in claim 1, wherein a positioning notch is provided on a bottom of the cover for positioning an end of the spring.

3. The connector for an optical transmitting and receiving device as claimed in claim 1, wherein a positioning notch is provided on a bottom of the cover, and is located between two parallel opposite protruding plates.

4. The connector for an optical transmitting and receiving device as claimed in claim 1, wherein a groove is provided on a top surface of the cover.

5. The connector for an optical transmitting and receiving device as claimed in claim 4, wherein the cover is provided on its top surface with a groove, in which is defined a big-radius cavity.

6. The connector for an optical transmitting and receiving device as claimed in claim 1, wherein the cover is provided on its top surface with a groove, in which is defined a big-radius cavity.

7. The connector for an optical transmitting and receiving device as claimed in claim 1, wherein shoulder portions are defined between the paired first opposite sidewalls and the top portion of the assembly part, each of the shoulder portions is defined with cavities for engaging with the plugs of the housing.

8. The connector for an optical transmitting and receiving device as claimed in claim 1, wherein the reducing holes on the assembly part are connected to the window.

9. The connector for an optical transmitting and receiving device as claimed in claim 1, wherein a chute is provided at the both of the sides of housing for fitting a first end and a second of the spring respectively, by such arrangements, the spring is firmly positioned.

* * * * *